United States Patent [19]

Perry

[11] Patent Number: 5,592,773

[45] Date of Patent: Jan. 14, 1997

[54] FISHING ROD FLOTATION DEVICE

[76] Inventor: Mickey J. Perry, Box 806, McCamey, Tex. 79752

[21] Appl. No.: 540,048

[22] Filed: Oct. 6, 1995

[51] Int. Cl.[6] .................................................. H01K 87/00
[52] U.S. Cl. .............................................. 43/25; D22/139
[58] Field of Search ........................ 43/25, 23; D22/139

[56] References Cited

U.S. PATENT DOCUMENTS

| | | | |
|---|---|---|---|
| D. 327,726 | 7/1992 | Lowrance et al. | D22/139 |
| D. 363,529 | 10/1995 | Nordstrom | D22/139 |
| 1,964,425 | 6/1934 | Bowman | 33/485 |
| 2,650,448 | 9/1953 | Lichtig | 43/25 |
| 3,624,849 | 12/1971 | Brannaker | 441/8 |
| 4,709,500 | 12/1987 | Yasumiishi | 43/25 |
| 4,944,111 | 7/1990 | Daniel | 43/25.2 |
| 5,187,878 | 2/1993 | Kuttner | 43/25 |

*Primary Examiner*—J. Elpel

[57] ABSTRACT

A floatation device is designed to be frictionally fitted around a fishing rod and will keep the rod from sinking in the event that it is dropped into the water. The device is of a cylindrical shape having a hollow central core and is formed of a dense polystyrene foam. A longitudinal slit along the axial length of the device allows a fishing rod to be positioned within the hollow central core, and the slit is angled so that once the device is attached to a rod, the rod will not accidentally become disengaged from the floatation member. The device further includes a fishing line clearance slot along its axial length, and the complete outer shell of the device is covered with a hard fluorescent plastic material.

5 Claims, 3 Drawing Sheets

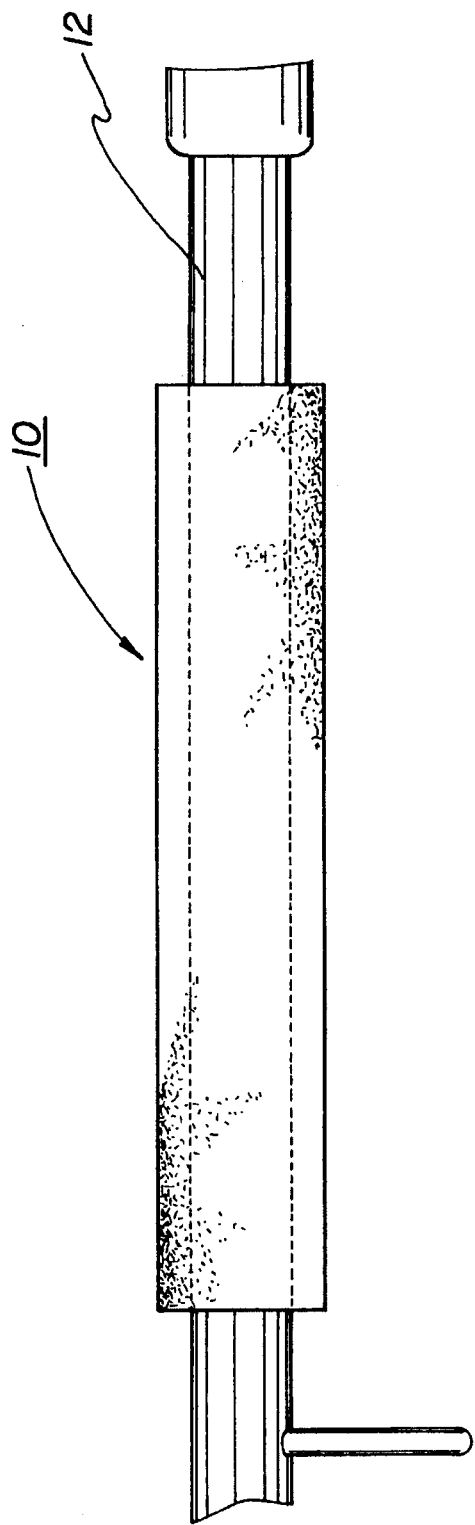
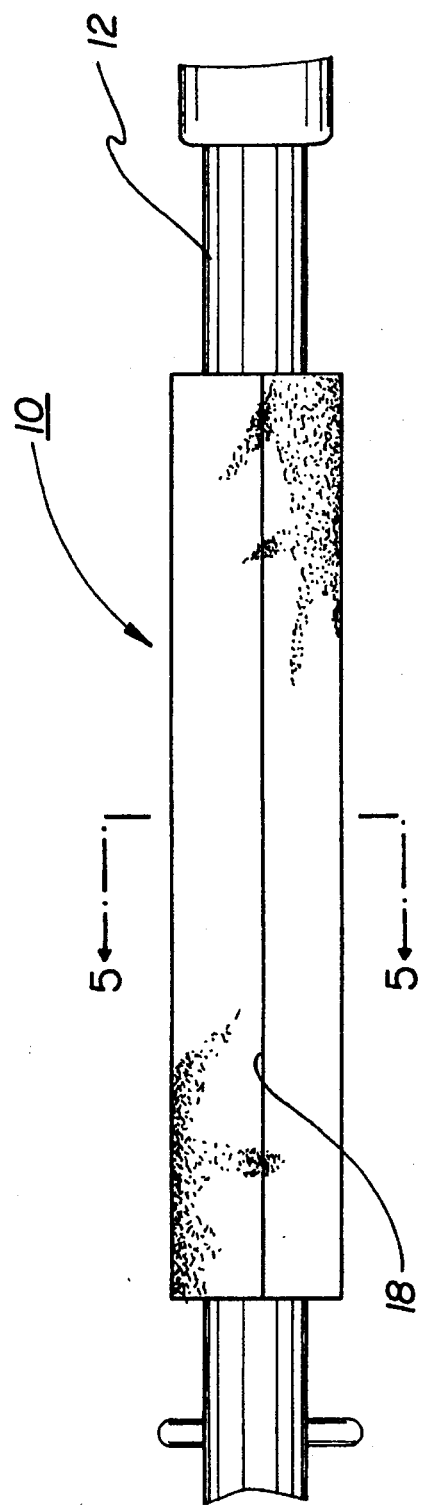
FIG. 2
FIG. 3

FISHING ROD FLOTATION DEVICE

BACKGROUND OF THE INVENTION

1. Field of the Invention

The present invention relates to flotation devices and more particularly pertains to a fishing rod flotation device for positioning around a fishing rod.

2. Description of the Prior Art

The use of fishing rod flotation devices is known in the prior art. This is evidenced by the granting of a number of United States patents relating to various functional and structural aspects of fishing rod flotation devices. Examples of known pertinent patents include U.S. Pat. No. Des. 327,726, which issued to Lowrance et al. on Jul. 7, 1992, and U.S. Pat. No. 4,583,314, which issued to Kirkland on Apr. 22, 1986.

While each of these prior art patents disclose devices which fulfill their respective particular objectives and requirements, and are most likely quite functional for their intended purposes, it will be noticed that none of these patents disclose a fishing rod flotation device for attachment around a fishing rod wherein such device is attached thereto by an angulated slit along a cylindrical float designed to receive the rod therethrough and prevent its egress therefrom. Additionally, the prior art does disclose the use of a flotation device which is fluorescent so as to facilitate the locating of a fishing rod dropped into the water during night time hours and further, the flotation devices of the prior art do not disclose floats having fishing line clearance slots so as to prevent abrasive contact from occurring between a fishing line and float assembly.

As such, there apparently still exists the need for new and improved fishing rod float devices wherein the same can be quickly and securely attached to a fishing rod, wherein such devices can also be easily located during the evening hours, and further wherein such devices are designed to prevent abrasive contact from occurring with an associated fishing line. In this respect, the present invention substantially fulfills this need.

SUMMARY OF THE INVENTION

In view of the foregoing disadvantages inherent in the known types of fishing rod flotation devices now present in the prior art, the present invention provides a new fishing rod flotation device wherein the same can be utilized to prevent the loss of a fishing rod which is accidentally dropped into the water. As such, the general purpose of the present invention, which will be described subsequently in greater detail, is to provide a new and improved fishing rod float assembly and method which has many of the advantages of the fishing rod flotation devices mentioned heretofore and many additional novel features that result in a fishing rod flotation device which is not anticipated, rendered obvious, suggested, or even implied by any of the prior art fishing rod flotation devices, either alone or in any combination thereof.

To attain this, the present invention generally comprises a flotation device which is designed to be frictionally fitted around a fishing rod and which will keep the rod from sinking in the event that it is dropped into the water. The device is of a cylindrical shape having a hollow central core and is formed of a dense polystyrene foam. A longitudinal slit along the axial length of the device allows a fishing rod to be positioned within the hollow central core, and the slit is angled so that once the device is attached to a rod, the rod will not accidentally become disengaged from the flotation member. The device further includes a fishing line clearance slot along its axial length, and the complete outer shell 15 of the device is covered with a hard fluorescent plastic material.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fishing rod flotation device and method which has many of the advantages of the fishing rod flotation devices mentioned heretofore and many novel features that result in a fishing rod flotation device which is not anticipated, rendered obvious, suggested, or even implied by any of the prior art fishing rod flotation devices, either alone or in any combination thereof.

It is another object of the present invention to provide a new fishing rod flotation device which may be easily and efficiently manufactured and marketed.

It is a further object of the present invention to provide a new fishing rod flotation device which is of a durable and reliable construction.

An even further object of the present invention is to provide a new fishing rod flotation device which is susceptible of a low cost of manufacture with regard to both materials and labor, and which accordingly is then susceptible of low prices of sale to the consuming public, thereby making such fishing rod flotation device economically available to the buying public.

Still yet another object of the present invention is to provide a new fishing rod flotation device which provides in the apparatuses and methods of the prior art some of the advantages thereof, while simultaneously overcoming some of the disadvantages normally associated therewith.

Still another object of the present invention is to provide a new and improved fishing rod flotation device which facilitates the use of such devices on virtually any type and size of fishing rod through the use of a resilient polystyrene foam which can be easily and securely fastened to such rods.

Yet another object of the present invention is to provide a new and improved fishing rod flotation device which is designed to prevent abrasive contact with fishing line associated with a fishing rod and which is further provided with a fluorescent coating to facilitate a locating of a fishing rod during the evening hours.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side elevation view of the invention.

FIG. 3 is a bottom plane view of the invention.

DESCRIPTION OF PREFERRED EMBODIMENTS

Figure 1:
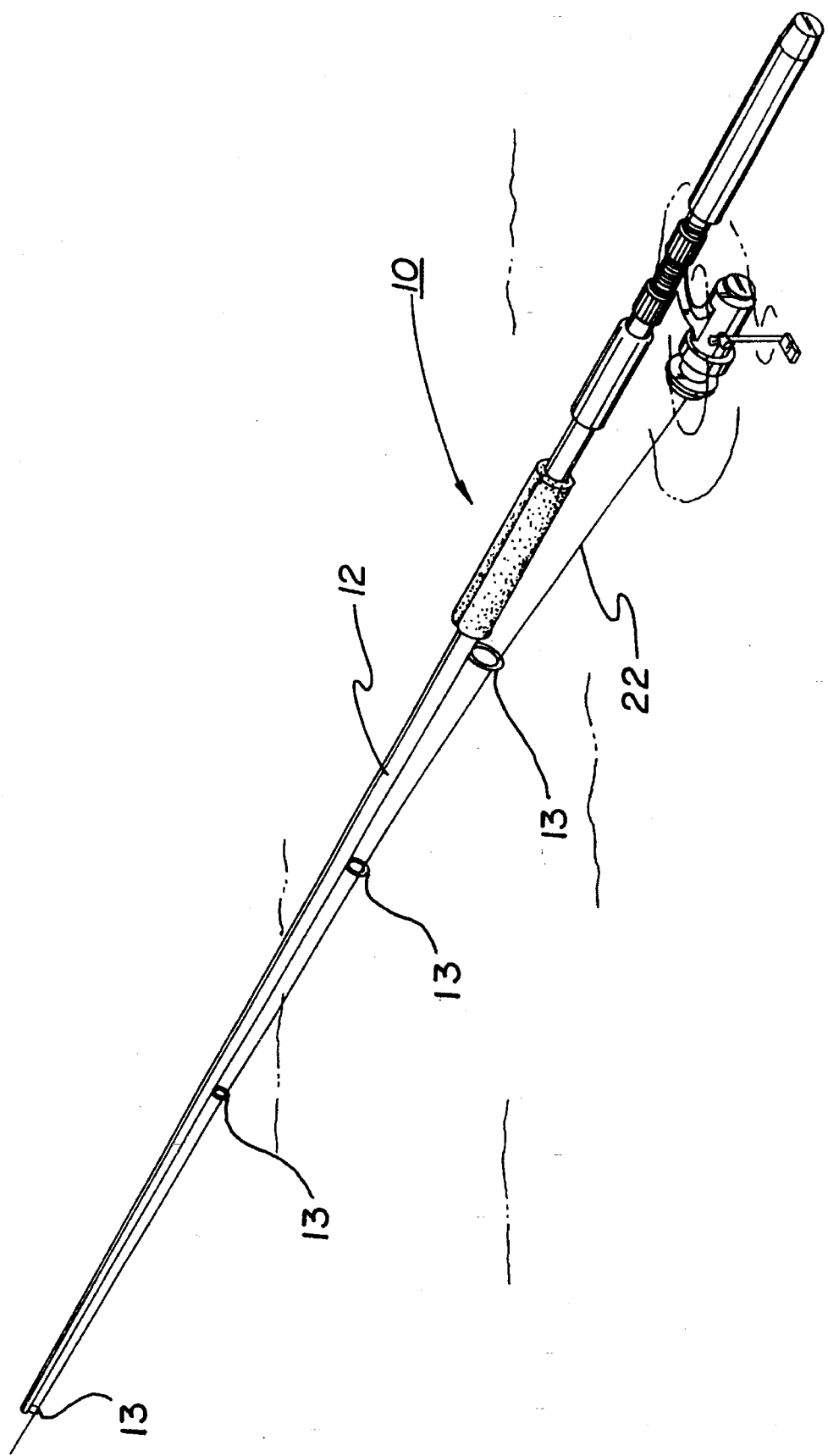
FIG. 1 is a perspective view of the invention showing the same operably attached to a fishing rod and reel assembly.

With reference now to the drawings, and in particular to FIGS. 1–5 thereof, a new fishing rod flotation device embodying the principles and concepts of the present invention and generally designated by the reference numeral 10 will be described.

More specifically, it will be noted that the fishing rod flotation device 10 comprising the present invention is designed to be operably attached around a fishing rod 12 as best illustrated in FIG. 1, said fishing rod 12 having line guide 13. The flotation device 10 is of a cylindrical design and includes a hollow central core 14 along its entire axial length. The flotation device 10 is formed of a dense polystyrene foam material which is both lightweight and durable, and which is a material having a high buoyancy factor whereby it operates as a good flotation material.

The outer surface of the flotation device 10 is covered with a thin hard fluorescent plastic material 15, and the intent of this shell 15 is to cover and protect against the somewhat abrasive texture of the dense polystyrene foam.

Figure 5:
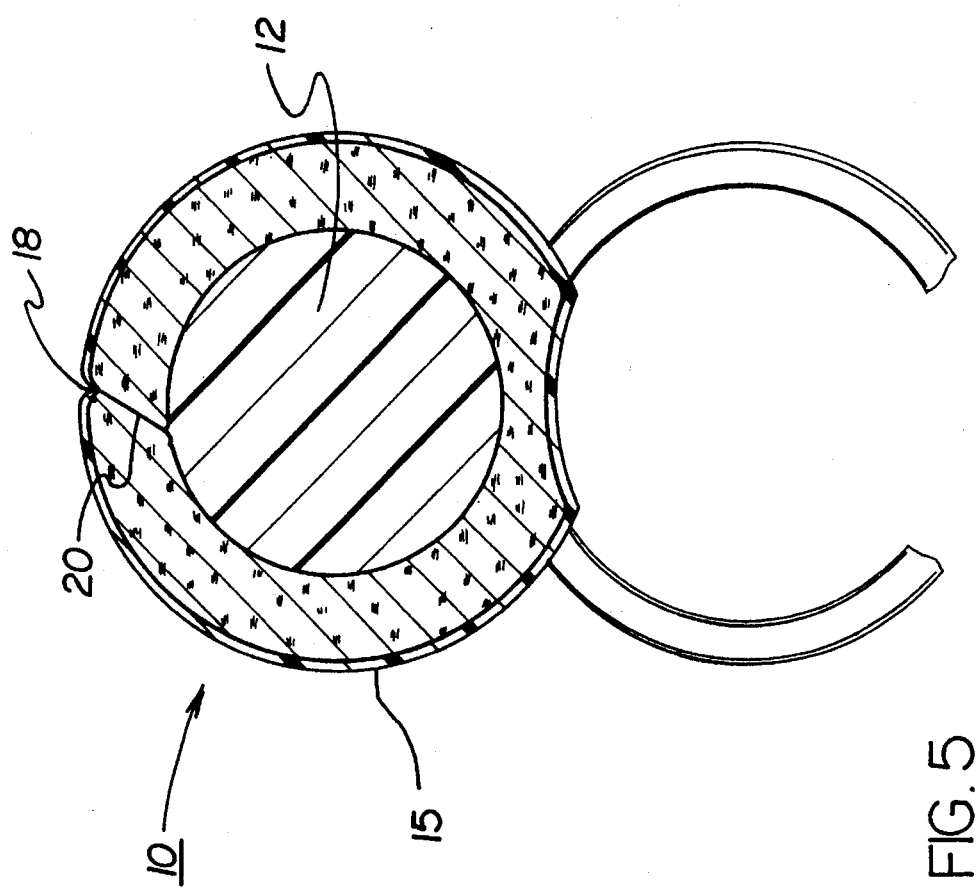
FIG. 5 is a cross-sectional view of the invention as viewed along the line 5—5 in FIG. 3.
Figure 4:
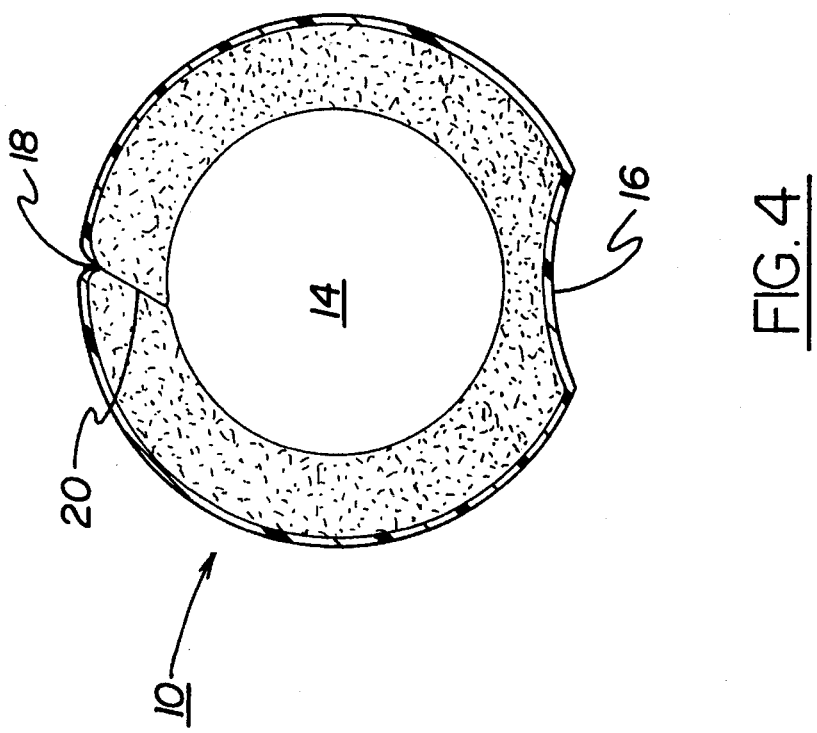
FIG. 4 is an end elevation view of the invention.

As best illustrated in FIGS. 4 and 5, the basic cylindrical shape of the flotation device 10 is interrupted by a shallow, concavely shaped slot 16 directed along the entire axial length of the device. Diametrically opposed to the slot 16 is a notch 18 that is also directed along the entire axial length of the device 10 and which is in parallel alignment with the slot 16.

The notch 18 is designed to initially receive the fishing rod 12 which is to be positioned within the hollow core 14 of the device 10, and is thus shaped as a groove so as to define a rod receiving means. The notch 18 also identifies the beginning of a slit 20 which extends completely through the device 10 so as to be in communication with the core 14. The shell 15 which is formed of a plastic material, is still resilient enough, along with the dense polystyrene foam, to allow a rod 12 to be forced through the slit 20 and into the core 14, with such resilience then allowing the device 10 to close securely around the rod as best illustrated in FIG. 5.

It should also be noted that the slit 20 is angulated so as to not be directed towards the center of the core 14, but rather at an angle away from such center, and this angulated positioning of the slit 20 facilitates a retention of a rod 12 within the device 10. More particularly, a rod 12 is less likely to become disengaged from the device 10 through the use of an angulated slit 20 as opposed to one which would be of a radial design.

As is now apparent, once the device 10 is positioned around a rod 12, the slit 20 operates to lockingly retain the device around the rod. Additionally, the fishing line clearance slot 16 substantially reduces the chance of any abrasive contact between the device 10 and fishing line 22. In the event that the fishing rod 12 is dropped into the water during the evening hours, the fluorescent outer shell 15 will allow the rod to be easily located by increasing the visibility of the flotation member 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved fishing floatation device comprising a float member selectively and removably attachable to said fishing rod along an axial length thereof, said float member being resiliently deformable during attachment to said fishing rod and being frictionally retained in engagement with said fishing rod after said attachment thereto, said float member being of a cylindrical design and having a hollow core extending therethrough along an axial length thereof, said fishing rod being retained within said hollow core when attached to said float member, said float member including a slit along said axial length thereof, said slit extending completely through a side wall of said float member and being operable to receive said fishing rod therethrough when said float member is engaged to said rod, said slit defining a plane which is angularly displaced to a radial plane extending through and being aligned with an axial center line of said hollow core, said slit being angulated so as to provide a firmer and more secure grip of said float member with said fishing rod when said fishing rod is retained within said hollow core.

2. The new and improved fishing rod flotation device as described in claim 1, and further wherein a notch is defined along said axial length of said float member, said notch lying along said plane of said slit, said notch being designed to provide a receiving and guide means for said rod during an initial engagement of said float member with said rod.

3. The new and improved fishing rod flotation device as described in claim 2, and further including a concavely shaped slot extending along said axial length of said float member, said slot being positionable proximate fishing line associated with said fishing rod when said float member is engaged with said fishing rod, said notch serving as a spacing means between said fishing rod and said fishing line, whereby abrasive engagement of said fishing line with said float member is prevented.

4. The new and improved fishing rod flotation device as described in claim 3, wherein said float member is covered with a fluorescent shell, thereby improving the chances for a visible retrieval of said fishing rod from any location during darkened evening hours.

5. The new and improved fishing rod flotation device as described in claim 4, wherein said float member is formed of a dense polystyrene foam and wherein said shell is of a hard and resilient plastic construction, said shell providing a smooth outer surface finish to said dense polystyrene foam.

* * * * *